US008085750B2

(12) United States Patent
Sedeffow

(10) Patent No.: US 8,085,750 B2
(45) Date of Patent: Dec. 27, 2011

(54) STREAMING VIDEO DATA TO MOBILE DEVICES

(75) Inventor: Peter Vassilev Sedeffow, London (GB)

(73) Assignee: Saffron Digital Limited, London (GB)

( * ) Notice: Subject to any disclaimer, the term of this patent is extended or adjusted under 35 U.S.C. 154(b) by 845 days.

(21) Appl. No.: 12/111,414

(22) Filed: Apr. 29, 2008

(65) Prior Publication Data
US 2008/0273519 A1 Nov. 6, 2008

(30) Foreign Application Priority Data

May 2, 2007 (GB) .................................. 0708440.3
May 10, 2007 (GB) .................................. 0709010.3

(51) Int. Cl.
H04L 29/06 (2006.01)
(52) U.S. Cl. ............. 370/345; 725/62; 725/88; 709/231
(58) Field of Classification Search .................. 370/345; 709/231, 232; 725/62
See application file for complete search history.

(56) References Cited

U.S. PATENT DOCUMENTS

| 5,592,226 | A | 1/1997 | Lee et al. | |
|---|---|---|---|---|
| 7,127,735 | B1 * | 10/2006 | Lee et al. ........................ | 725/87 |
| 2003/0007558 | A1 | 1/2003 | Vetro et al. | |
| 2003/0067981 | A1 | 4/2003 | Zhao et al. | |
| 2004/0255139 | A1 | 12/2004 | Giobbi | |
| 2005/0278794 | A1 | 12/2005 | Leinonen et al. | |
| 2006/0056508 | A1 | 3/2006 | Lafon et al. | |
| 2006/0095942 | A1 | 5/2006 | van Beek | |
| 2006/0154648 | A1 | 7/2006 | Oh et al. | |
| 2006/0190410 | A1 | 8/2006 | Harper | |

(Continued)

FOREIGN PATENT DOCUMENTS
EP       1495613 A1      1/2005
(Continued)

OTHER PUBLICATIONS

REAL—"Delivering Total Mobile TV: Combining Streaming and Broadcast for a Complete Mobile Television Solution"; C. Steck http://docs.real.com/industries/DeliveringTotalMobileTV.pdf. Dated Apr. 2006. Rev. 1.0.2, 12 pages (emphasizing p. 9).

Primary Examiner — Seema S Rao
Assistant Examiner — Henry Baron
(74) Attorney, Agent, or Firm — Harness, Dickey & Pierce, P.L.C.

(57) ABSTRACT

The streaming of video data to mobile devices (101 to 103) is shown in which a support server (106) and an asset server (107, 108) are provided. The support server receives a first request (303) from a mobile device for a selected video asset. The support server relays (304, 305) the first request to the asset server. The asset server serves (306) the selected video stream to the requesting mobile device from the start of the asset. The support server is halted (307) from streaming video and the asset server provides an indication (308) of the halt position to the support server. The support server records an indication of the mobile device and the halt position of the asset. The support server receives a second request (311) from the mobile device for the selected asset. The support server relays (310 to 313) the selected request to the asset server and the asset server serves (314) the selected asset as a video stream to the requesting mobile device from the previous halt position.

13 Claims, 16 Drawing Sheets

U.S. PATENT DOCUMENTS

| | | |
|---|---|---|
| 2007/0098162 A1 | 5/2007 | Shin |
| 2007/0271106 A1 | 11/2007 | Lee et al. |
| 2009/0037596 A1* | 2/2009 | Math et al. .................... 709/231 |

FOREIGN PATENT DOCUMENTS

| | | |
|---|---|---|
| EP | 1596594 | 11/2005 |
| EP | 1659736 | 5/2006 |
| EP | 1732333 | 12/2006 |
| EP | 1770957 | 4/2007 |
| JP | 2003-299064 | 10/2003 |
| JP | 2005-260541 | 9/2005 |
| JP | 2005-311459 | 11/2005 |
| WO | WO 97/04585 | 2/1997 |
| WO | WO 00/18137 | 3/2000 |
| WO | 03/088617 A1 | 10/2003 |
| WO | 2004/030310 A1 | 4/2004 |
| WO | WO 2005/083917 | 9/2005 |
| WO | WO 2006/077526 | 7/2006 |
| WO | 2006/113655 A1 | 10/2006 |

* cited by examiner

| ASSET ID | TITLE | USER ID | HALT |
|---|---|---|---|
| 0176 | FILM 3 | 12889 | |
| 3040 | FILM Z | 12889 | 00:36:42 |
| 1244 | FILM B | 34264 | 01:04:33 |

Fig 9

STREAMING VIDEO DATA TO MOBILE DEVICES

CROSS REFERENCE TO RELATED APPLICATIONS

This application claims priority from United Kingdom patent application number 0708440.3 filed 2 May 2007 and United Kingdom patent application number 0709010.3 filed 10 May 2007, the entire disclosure of which are incorporated herein by reference in its entirety.

BACKGROUND OF THE INVENTION

1. Technical Field

The present invention relates to streaming video data to mobile devices.

2. Description of the Related Art

Video streaming over the Internet is known for which a video data file is transmitted to a requesting browser substantially in real time. However, the video data is streamed in packets therefore it is necessary for these packets to be buffered, reassembled and decoded at the browser. Synchronisation is therefore achieved at the browser itself and the data is not transmitted over the Internet in a synchronous fashion, unlike conventional broadcast techniques.

The possibility of streaming video data to mobile devices has been considered for some time. However, a problem exists in that mobile transmission over radio networks is susceptible to being lost temporarily, usually through loss of signal in the radio network. This may occur for example when the signal is temporarily obscured (such as when a train enters a tunnel) or during a hand over from one cell from another.

It is appreciated that loss of signal situations are occurring less frequently but it also appreciated, given the nature of the radio environment, that loss of signal situations will never be eliminated. Thus, the present radio network creates problems when requests are made for video assets of a significant length (say 1 hour 30 minutes) to be streamed to mobile devices.

BRIEF SUMMARY OF THE INVENTION

According to an aspect of the present invention, there is provided apparatus for streaming video data to mobile devices. The apparatus comprises a support server and an asset server in which the support server receives a first request from a mobile device for a selected video asset, said support server relays the first request to the asset server and the asset server serves the selected video stream to the requesting mobile device from the start of the asset. The support server is halted from streaming video and the asset server provides an indication of the halt position to the support server and the support server records an indication of the mobile device and the halt position of the asset. The support server receives a second request from the mobile device for the selected asset and the support server relays the second request to the asset server. The asset server serves the selected asset as a video stream to the requesting mobile device from the previous halt position.

BRIEF DESCRIPTION OF THE SEVERAL VIEWS OF THE DRAWINGS

FIG. 9 illustrates a database;

DESCRIPTION OF THE BEST MODE FOR CARRYING OUT THE INVENTION

Figure 1:
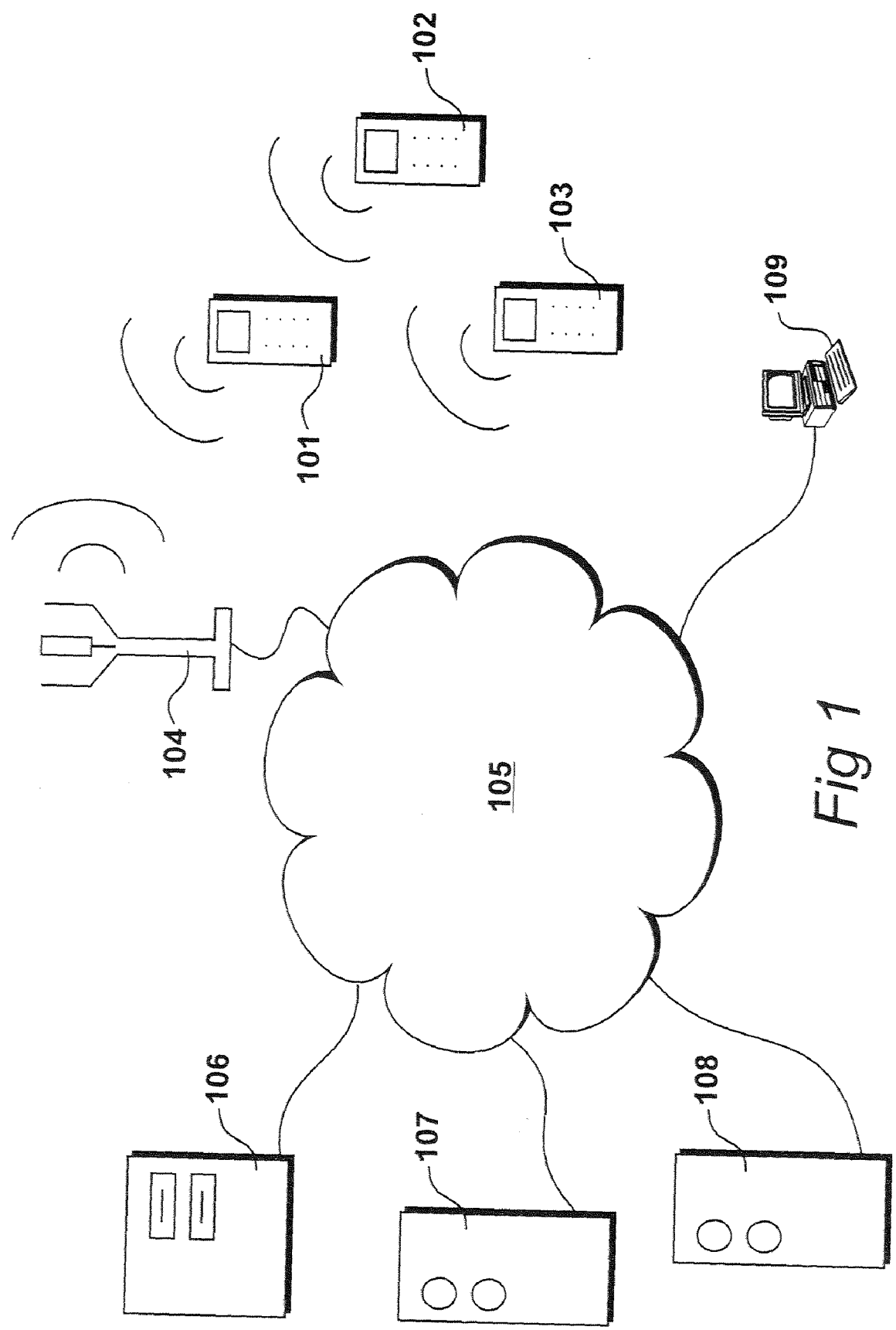
FIG. 1 shows an environment in which video data may be streamed.

An environment in which video data may be streamed to mobile devices is shown in FIG. 1. Typical mobile devices are illustrated at 101, 102 and 103. Typically, these are mobile cellular telephones but alternatively, they could be personal digital assistants, gaming consoles, ultra-mobile portable computers or any other type of mobile device fitted with mobile telephony.

Mobile devices 101 to 103 communicate with a base station 104 that in turn communicates with a network 105. Network 105 shown in FIG. 1 represent all relevant interconnected networks including private exchanges and the Internet etc. The mobile devices 101 to 103 execute wireless applications and as such communicate with a wireless applications protocol (WAP) server 106. Server 106 is responsible for serving many types of wireless applications to the mobile devices and the present embodiment is concerned with the streaming of video material, including feature-length productions (movies) which previously were difficult to stream to mobile devices given the high probability of loss of communication during the streaming process.

Video material is stored in compressed form on video servers, including video server 107 and video server 108. Servers 107 and 108 could be administered by totally independent organisations, each having access to particular legally protected assets. Each asset may be identified by a resource locator and the video material itself is provided to the requesting mobile device using real-time streaming protocol (RTSP).

When a mobile device, such as device 101 has been provided with details of an asset location, it is possible for the mobile device itself to record this information in the form of a bookmark. Thus, if service has been interrupted, it will be possible for a further request to be made so as to re-establish the communication of the stream. However, it has been appreciated that a bookmark is only capable of identifying the location of the asset itself and does not possess any functionality for recording a position within the asset. Thus, using conventional systems, the re-establishment of a link would result in the asset being streamed from its starting position again; thus, frustratingly, a mobile viewer may never actually reach the end of the production. The present embodiment provides enhanced functionality at the WAP server 106 in order to overcome this problem.

As shown in FIG. 1, it is also possible for a standard personal computer 109 to communicate with the servers 106 to 108 via the network 105. Thus, in addition to assets being streamed to the mobile devices 101 to 103 it is also possible for these assets to be streamed to the fixed computer system 109. Furthermore, the fixed system 109 may be used by a user having a mobile device to perform administrative tasks on their account etc.

Figure 2:
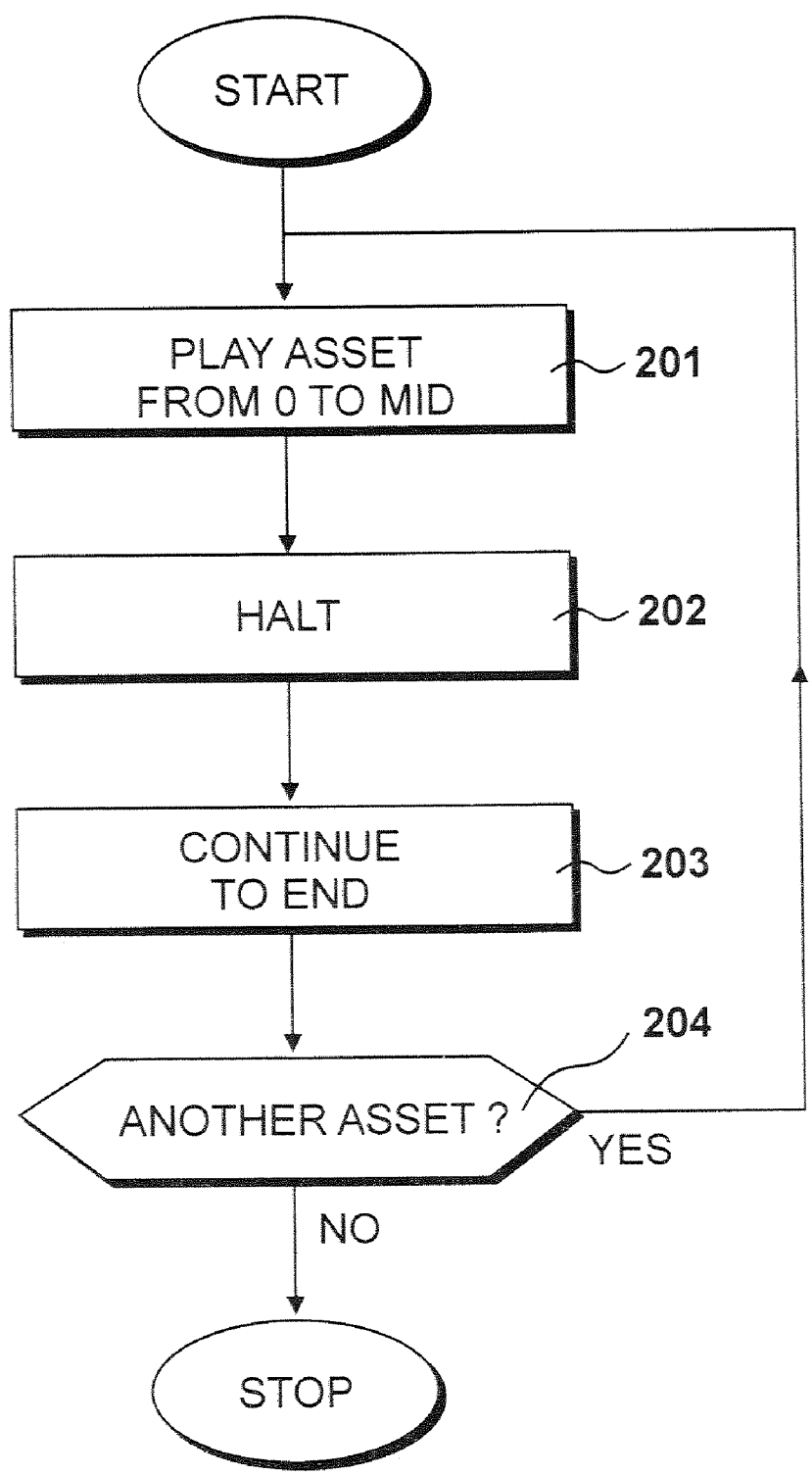
FIG. 2 illustrates functionality at a mobile phone.

Enhanced functionality of the present embodiment as perceived by an operator of a mobile device is illustrated in FIG. 2. A user has been provided with the functionality to view video assets. At step 201 a video asset is played from a start position. i.e. a zero position, to a mid position within the asset. This results in the streaming of the asset being halted at step 202. This halt condition may occur in response to an operation made by the user or alternatively the halt condition may occur due to a failure of the network, as happens, say, when a mobile user enters a tunnel for example.

At step 203 the playing of the asset is continued. However, in accordance with the functionality of the embodiment, streaming continues from the previously identified mid position to the end of the asset.

Thereafter, at step 204 a question is asked as to whether another asset is to be viewed and when answered in the affirmative control is returned to step 201 allowing another asset to be selected and played. It should also be appreciated that the playing of the asset may be halted on many occasions and on each occasion the playing of the asset may be resumed from the previous halt location. Further, in accordance with a refinement of the embodiment, it is possible for a user to specify a particular location of the asset from which playing should commence.

Figure 3:
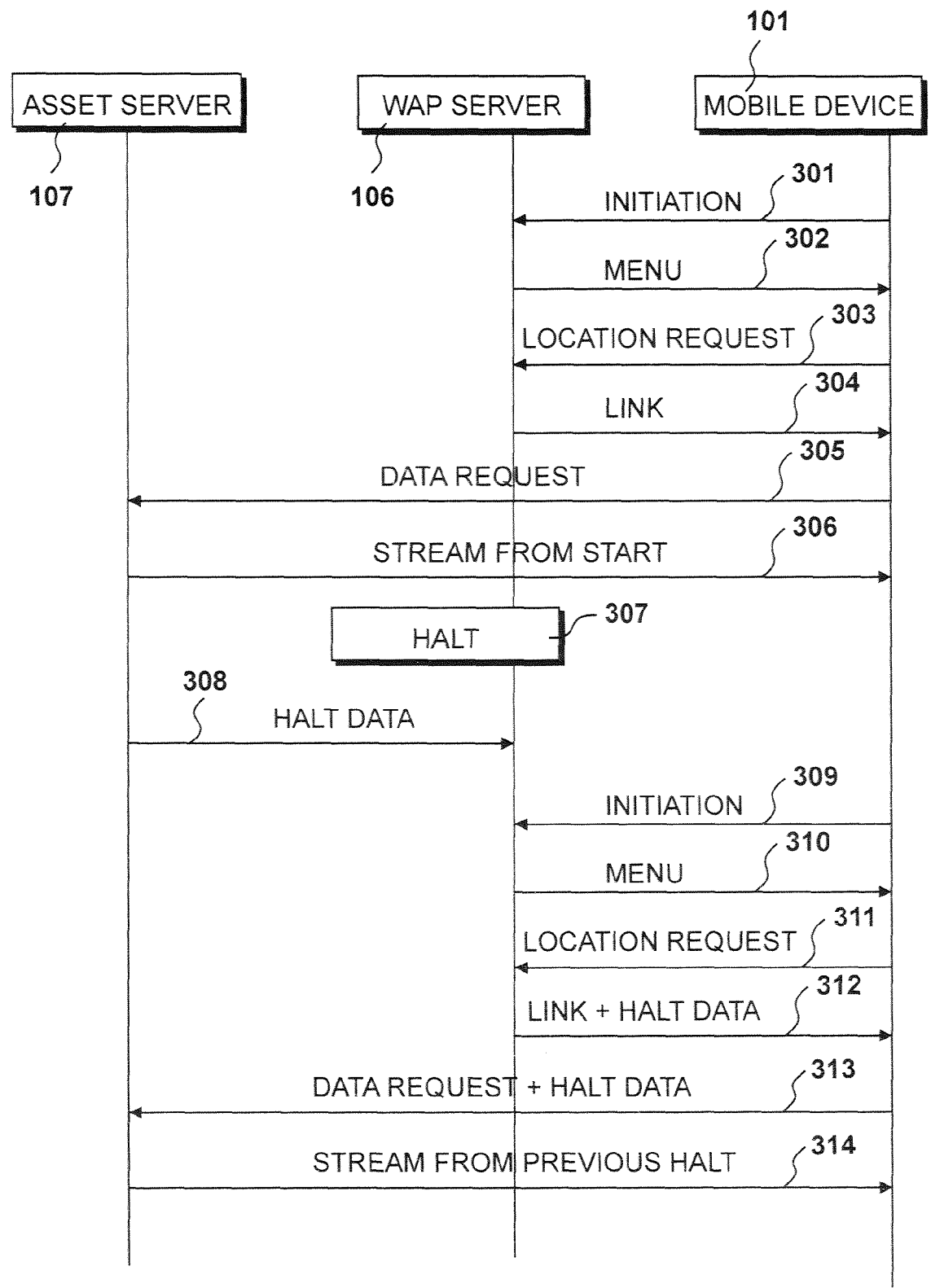
FIG. 3 illustrates a telecommunications diagram showing an example of communications within the environment.

FIG. 3 illustrates a telecommunications diagram of communications executed within the environment of FIG. 1 in order to provide the functionality of FIG. 2. Asset server 107 is illustrated, along with WAP server 106 and a mobile device 101. Mobile device 101 initiates communication 301 to request service from the WAP server 106. The WAP server 106 issues a communication 302 providing data to the mobile device which in turn results in the display of a menu (FIG. 4) at the mobile device 101.

In response to the menu being displayed at the mobile device, the mobile device 101 issues a further communication to the WAP server 106 making a location request 303. Thus, for example, the mobile device 101 makes a request for a particular asset to be streamed.

The WAP server 106 does not itself return the asset data to the mobile device 101. As shown by communication 304, the WAP server provides details of a link or universal resource location (URL) to the device 101. In this example, the link includes information such as an identification of the asset, identification of mobile device 101, and information relating to whether or not the asset has been partially or wholly viewed before.

Having received the location, the mobile device 101 issues a request, illustrated by communication 305, directly to the asset server 107. In response to receiving this request and as illustrated by communication 306, the asset server 107 streams the asset data to the mobile device 101.

Streaming continues, as at step 201 of FIG. 2, until a halt condition occurs, as illustrated at 307. As previously stated, the halt condition 307 may occur due to a selection made by the user or alternatively the halt condition may occur due to a failure of the network.

In accordance with the present embodiment, the asset server 107 issues a communication 308 to the WAP server identifying the position at which the halt occurred. This information is known to the asset server and would in the normal course of events be recorded in a log locally maintained at the asset server 107. It is therefore a relatively straightforward matter to access this data at server 107 and relay the information to the WAP server 106 over the network 105. At the WAP server 106 the relevant information is retained in a database (FIG. 9) for subsequent retrieval.

Figure 6:
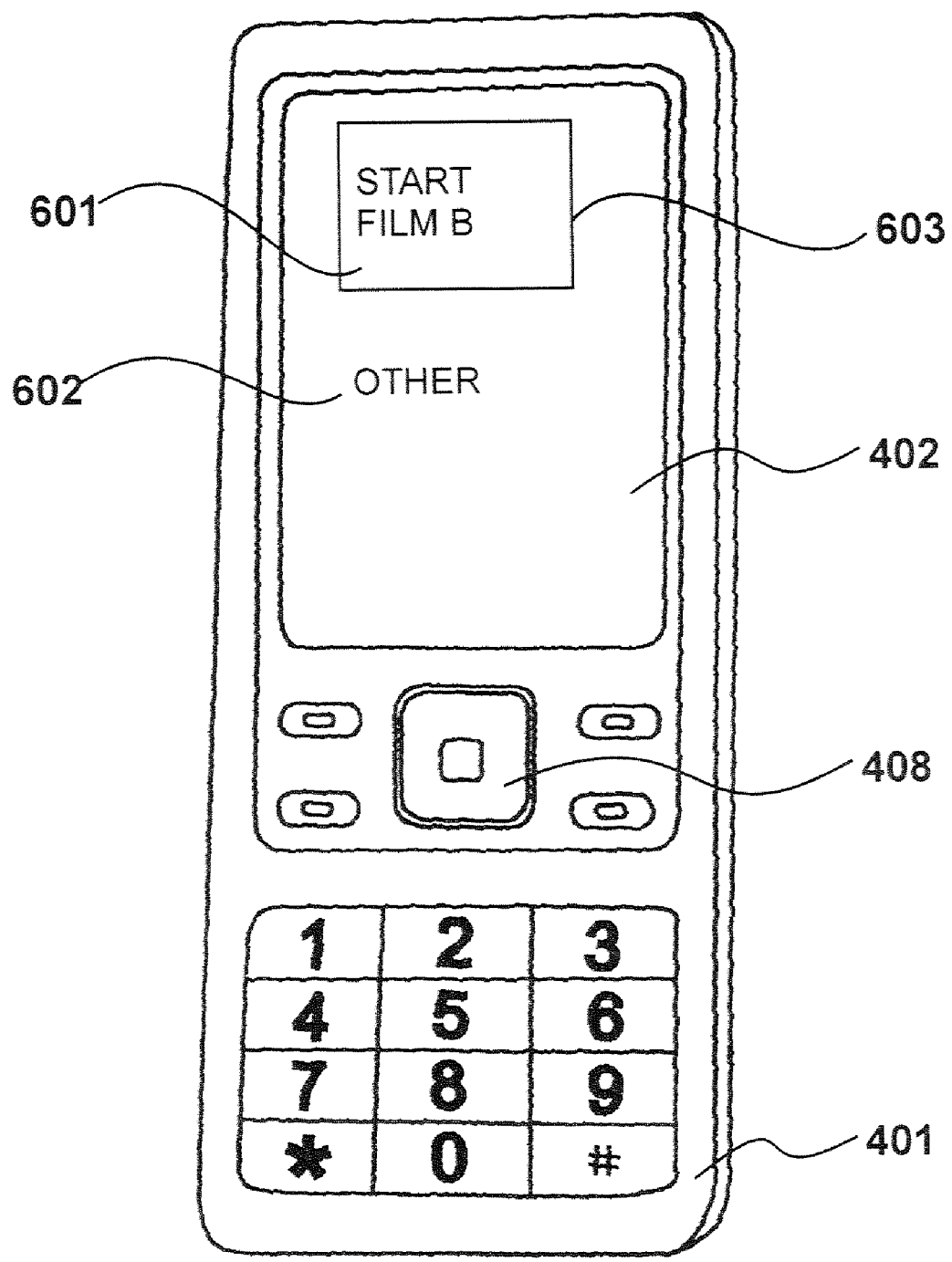
FIG. 6 illustrates a further menu displayed by the mobile device.

As illustrated by communication 309 a mobile device 101 makes a further initiation request for the streaming of data. Again, this results in the downloading of a menu as shown by communication 310, from the WAP server 106 to the mobile device 101. However, on this occasion, the WAP server is aware that a halt has occurred and therefore transmits a different menu inviting the user to resume streaming from the previous halt position (FIG. 6).

Figure 12:
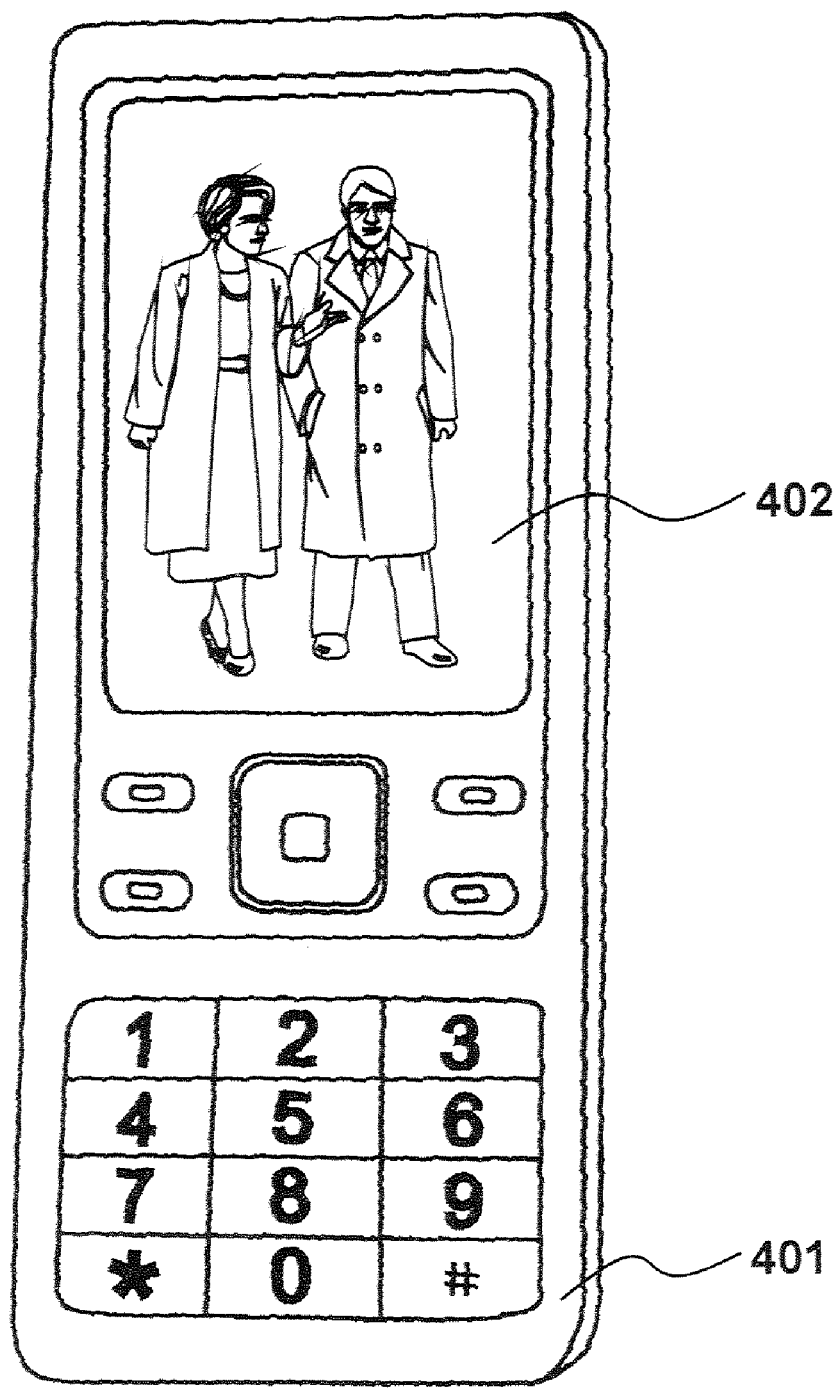
FIG. 12 illustrates a resume option displayed to a user.

As illustrated by communication 311, the mobile device sends a location request to the WAP server 106. Again, the WAP server returns the appropriate link, as illustrated by communication 312, but on this occasion the link also includes additional halt data identifying the location at which the previous halt occurred. This information is conveyed as part of the universal resource location in the form of common gateway interface (CGI) parameters which are then interpreted by the located asset server. Thus, in response to communication at 312, a further communication 313 is made from the mobile device 101 directly to the asset server 107 which on this occasion includes data requesting the streaming of the asset but in addition includes the CGI parameter representing the previous halt position. Consequently, in response to this request, communication 314 streams the asset data from the asset server 107 to the mobile device 101 starting at the previous halt position (FIG. 12). In addition to the communications shown in FIG. 3, mobile device 101 also provides acknowledgements to asset server 107 as packets of streamed data are received.

Figure 4:
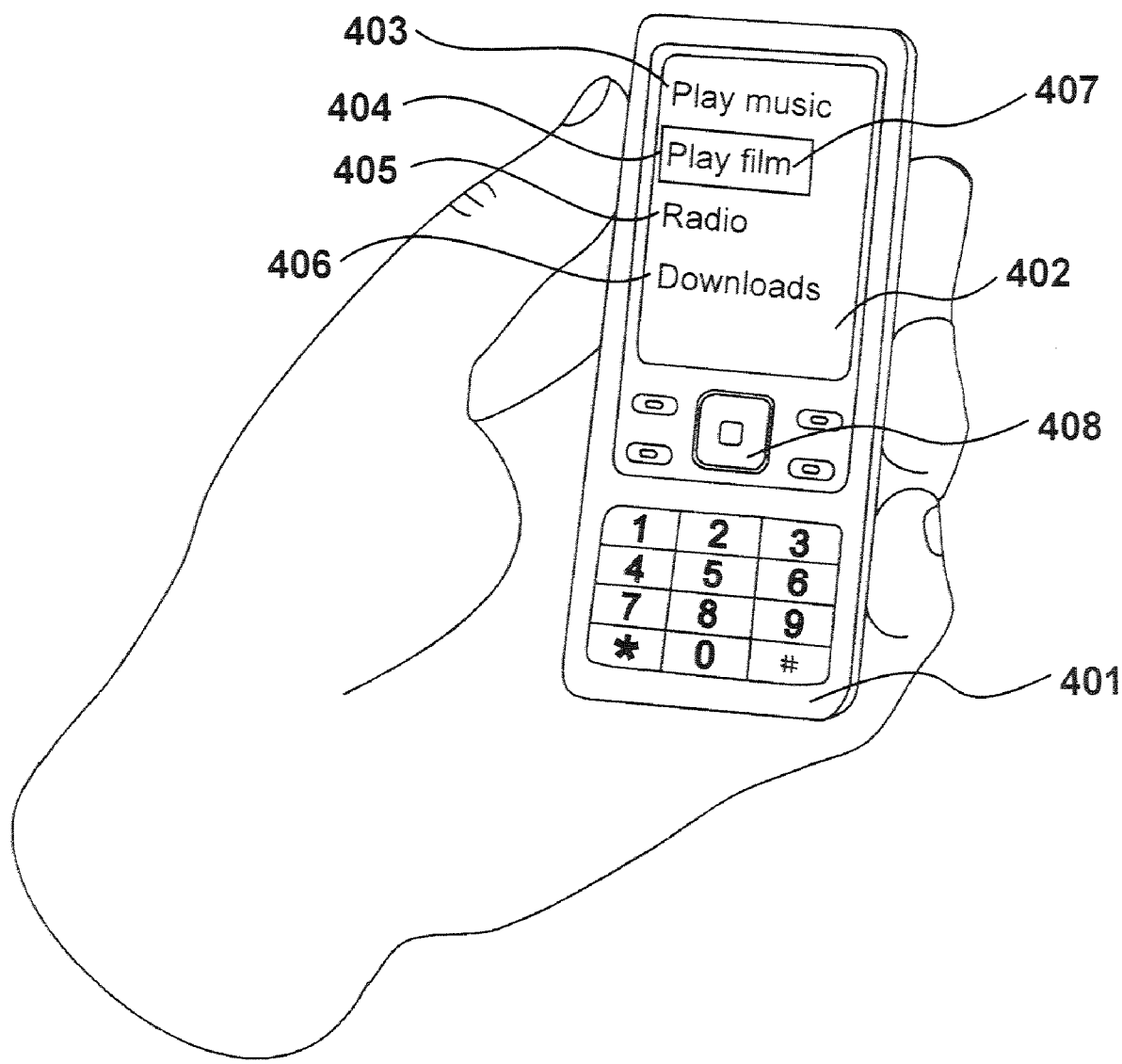
FIG. 4 shows a mobile device displaying a menu.

FIG. 4 shows a mobile device 101, in this example a mobile telephone 401, with a display 402. A menu is shown on display 402. This menu is part of the functionality of mobile telephone 401. In this example the menu is displaying options "Play music" 403, "Play film" 404, "Radio" 405 and "Downloads" 406. Box 407 illustrates that the "Play film" option has been selected in response to manual operation of scroll button 408. Scroll button 408 is then pressed in order to execute the selection of menu item 404. As a result of this, procedures are initiated with WAP server 106 as shown by communication 301.

Figure 5:
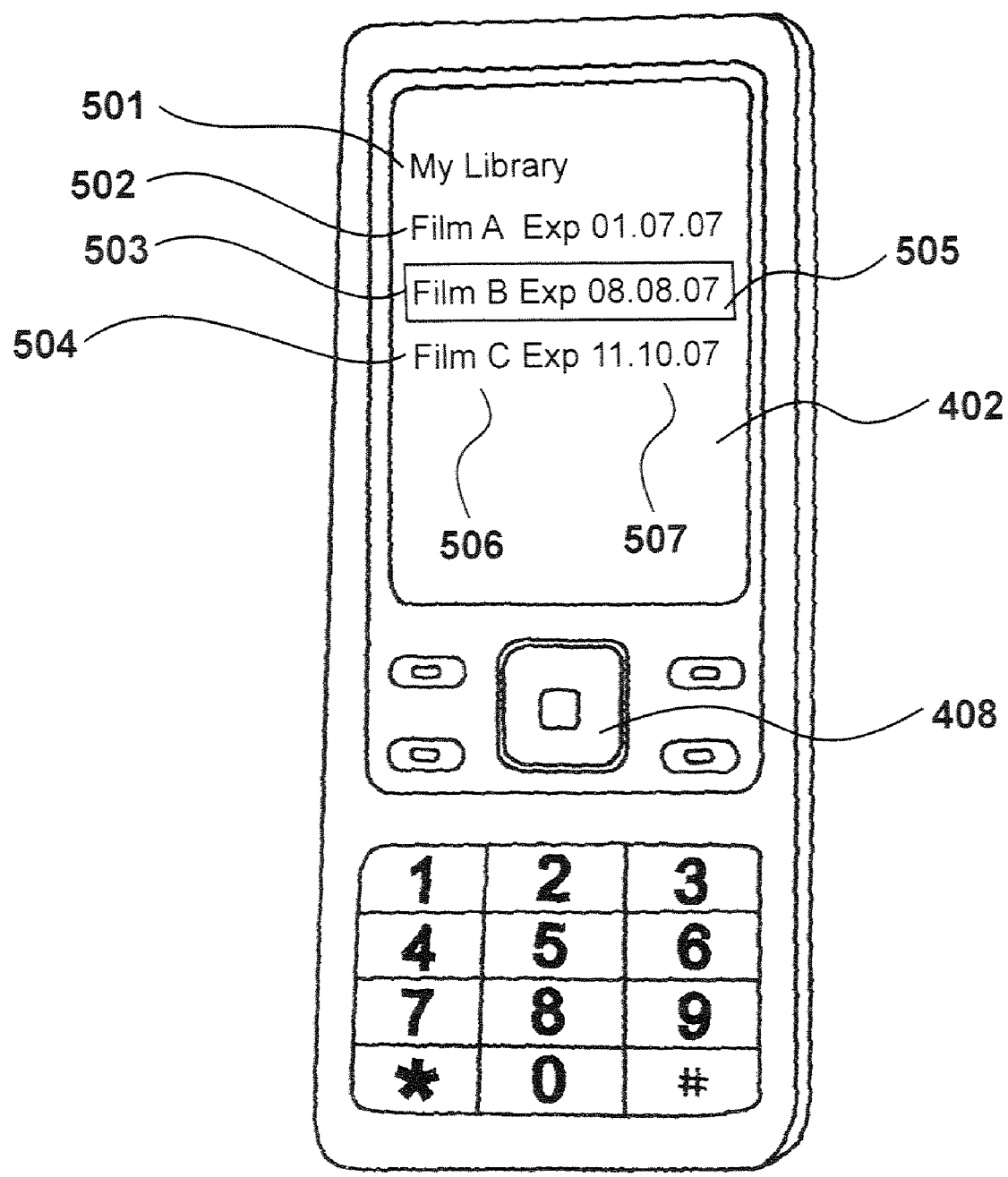
FIG. 5 shows a further menu displayed by the mobile device.

FIG. 5 shows a menu displayed on screen 402 in response to making selection 404 by the execution of button 408. The menu shown in FIG. 5 is provided by WAP server 106 as represented by communication 302. This menu shows particular films under the heading "My library" at 501 representing films that are available for a particular user to watch. In this example, three entries are present, identified at 502, 503 and 504. In this example, entry 503 has been selected, as shown by selected box 505.

Each entry 502 to 504 includes an indication of the name of the film 506 in combination with an expiry date 507. Thus, in response to a particular subscription being made, possibly implemented by a communication using the personal computer 109, each of the films may be viewed for a particular length of time, after which the subscription expires and a further subscription must be made if further viewing is to be requested. In alternative examples an asset may be viewable a fixed number of times within a given period before expiry.

In response to button 408 being pressed to select entry 503, a location request is sent to WAP server 106, as represented by communication 303.

FIG. 6 illustrates a menu displayed on mobile telephone 401 as a result of mobile telephone 401 receiving a link from WAP server 106, as shown by communication 304 in FIG. 3. In this example, WAP server 106 holds details of links or universal resource locations which allow mobile telephone 401 to access assets. Options are provided on screen 402. A first option, shown at 601 allows a user to choose to start playing film B (the film selected as part of operations described with reference to FIG. 5). A further option at 602, "Other" is provided if a user wishes to conduct other operations, such as those shown in FIG. 13. Box 603 indicates that the user has chosen to start playing the film. i.e. that the user has selected option 601. Once a user has navigated appropriately with scroll button 408, and pressed button 408, a data request is initiated. This is shown as communication 305 in FIG. 3. This request goes to asset server 104. It uses the link provided by the WAP server at 304.

As a result of the data request (305), asset server 104 streams film data, from the beginning of the asset, as shown by communication 306, to mobile telephone 401.

Figure 7:
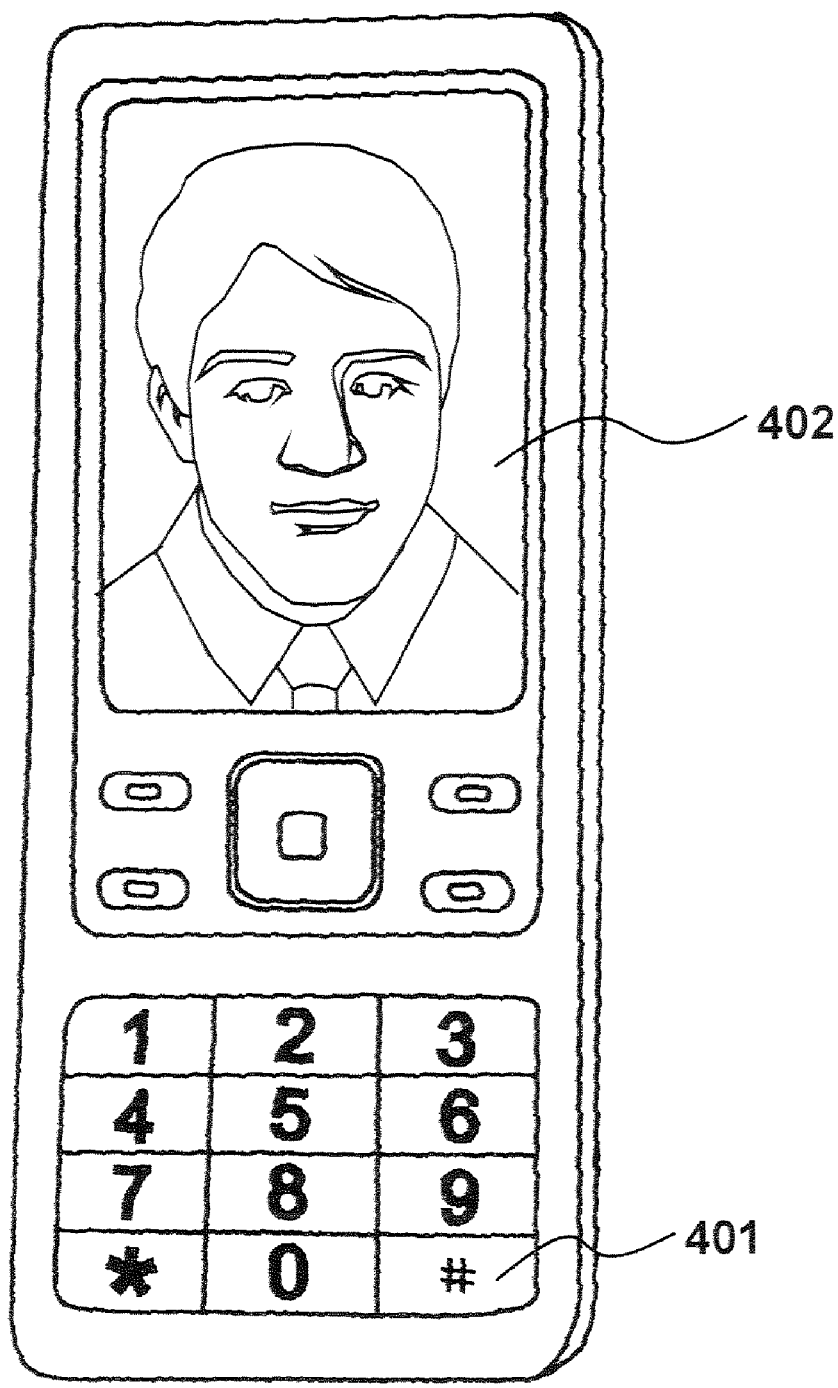
FIG. 7 shows a mobile telephone displaying a video asset.

FIG. 7 shows mobile telephone 401, with an image on screen 402, thereby representing that film B is now being streamed from asset server 104 to mobile telephone 401 and being displayed to a user.

Figure 8:
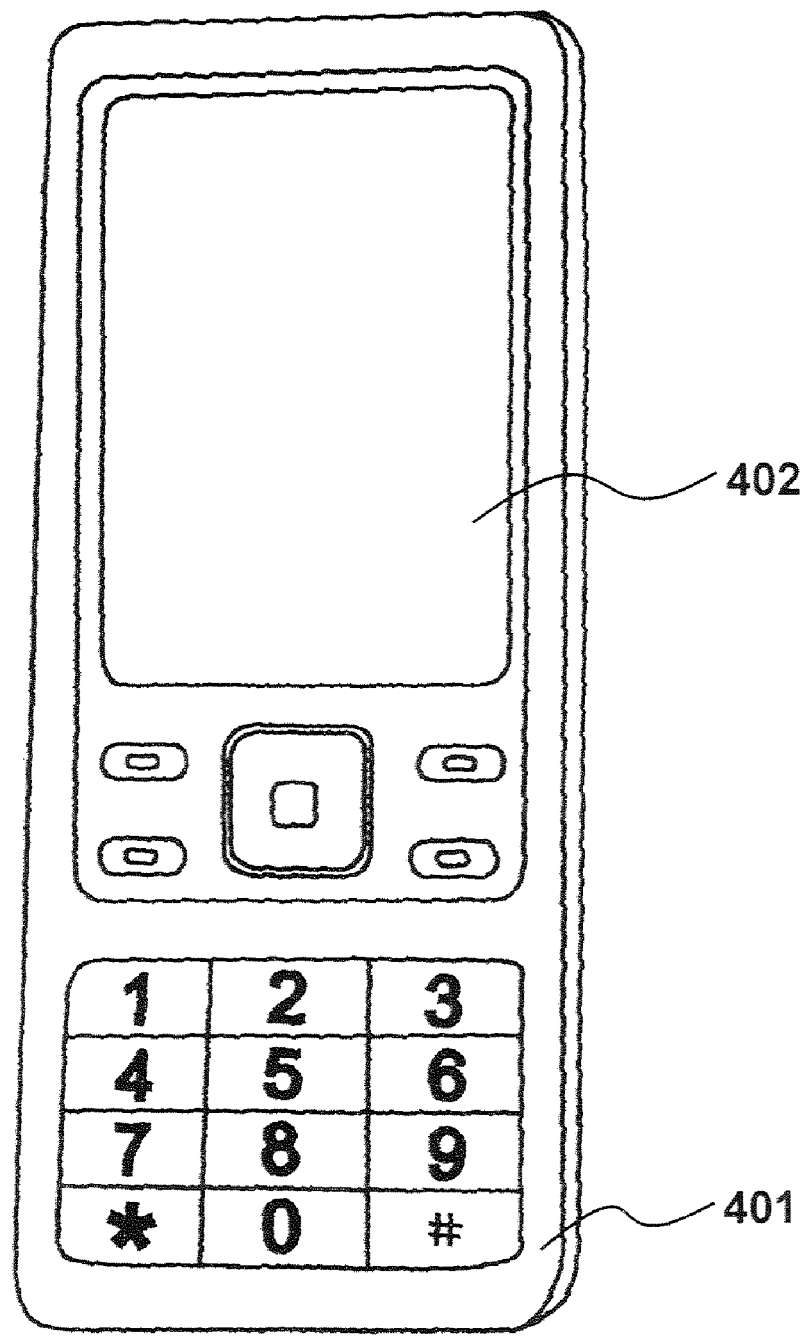
FIG. 8 illustrates the occurrence of a halt.

FIG. 8 shows a representation of a halt having occurred. This is described at step 202 of FIG. 2 and is represented at 307 in FIG. 3. Whether the halt occurred as a result of user input (i.e. the user chooses to stop watching the asset) or due to a technical issue such as a network failure is not relevant. If a technical issue is the cause, then the WAP server may instruct the asset server to stop streaming, or the asset server may stop automatically. When the halt occurs, as shown by screen 402 of mobile telephone 401 being blank as shown in FIG. 8, the asset server 107 issues a communication 308 to the WAP server identifying the position at which the halt occurred. A representation of the storage of the halt information is shown in FIG. 9.

A representation of a database 901, located at WAP server 106 is shown in FIG. 9. When streaming of an asset halts, asset server 107 is aware of this. If the halt is caused by the receipt of user input then asset server 107 will know the halt position by the receipt of the user input. Alternatively, if the halt is caused by a technical issue such as loss of network connectivity, or for example the battery of mobile telephone 401 running out, then asset server 107 will be made aware that a halt has occurred a few second afterwards when it ceases to receive acknowledgement messages indicating that the streamed packets of data have been received.

Consequently, asset server 107 sends a halt message to WAP server 106, which can record the CGI parameter relating to the halt position in a database, and refer back to it on later occasions. Fields represented in database 901 in this example are shown as "Asset ID" 902, "Title" 903, "User ID" 904 and "Halt" 905. The field 904 provides an indication of the mobile device. The field 905 provides an indication of the halt position of the asset. Three lines of data are shown at 906, 907 and 908. Data at line 906 illustrates that asset 0176 (Film 3) has been subscribed to by user 12889. The absence of data in the "halt" field means that user 12889 has not yet received a stream of any of asset 0176.

Data at line 907 shows that user 12889 has also subscribed to asset 3040 (Film Z), and that they have received a stream of this asset, up to a halt position of 00:36:42. This indicates that they have received a stream of the first thirty-six minutes and forty-two seconds of asset 3040.

Line 908 shows data relating to the halt described in this example, with reference to FIG. 8. It shows that asset 1244 (Film B) has been subscribed to by user 34264 (owner of mobile telephone 401). It has also recorded the halt position as 01:04:33, which is the point at which the halt shown in FIG. 8 occurred. Thus line 908 was written to database 901 at 308 as a result of halt 307.

Figure 10:
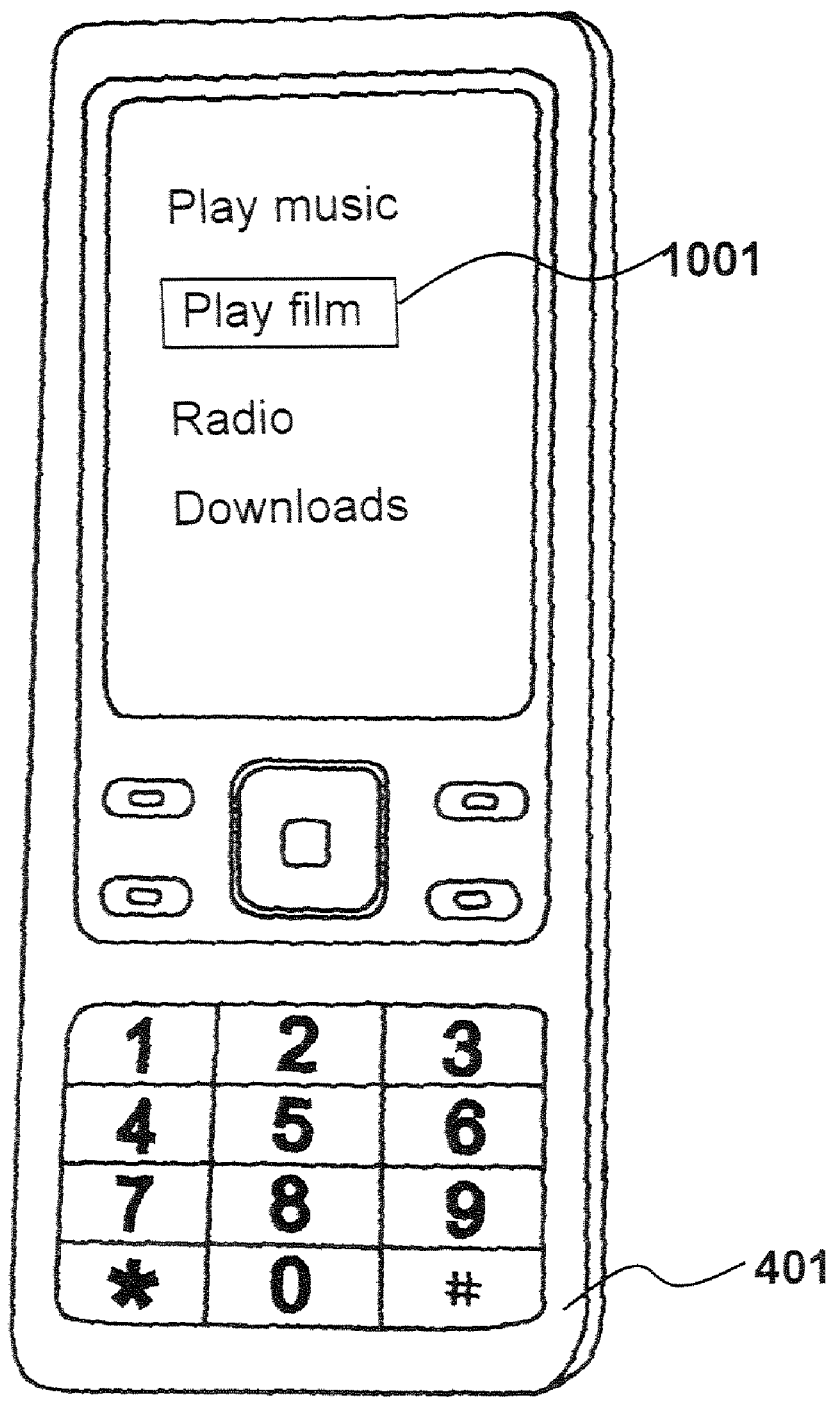
FIG. 10 illustrates an input being received.

Following the halt at 307, at a later time, a user may wish to resume viewing of the asset. Thus, communications with WAP server 106 are again initiated by input received as shown in FIG. 10. The menu shown on mobile telephone 401 in FIG. 10 (the same menu represented in FIG. 5) allows a user to select that they wish to play a film, as shown by box 1001. This input is sent to the WAP server as shown by communication 309 in FIG. 3.

Figure 11:
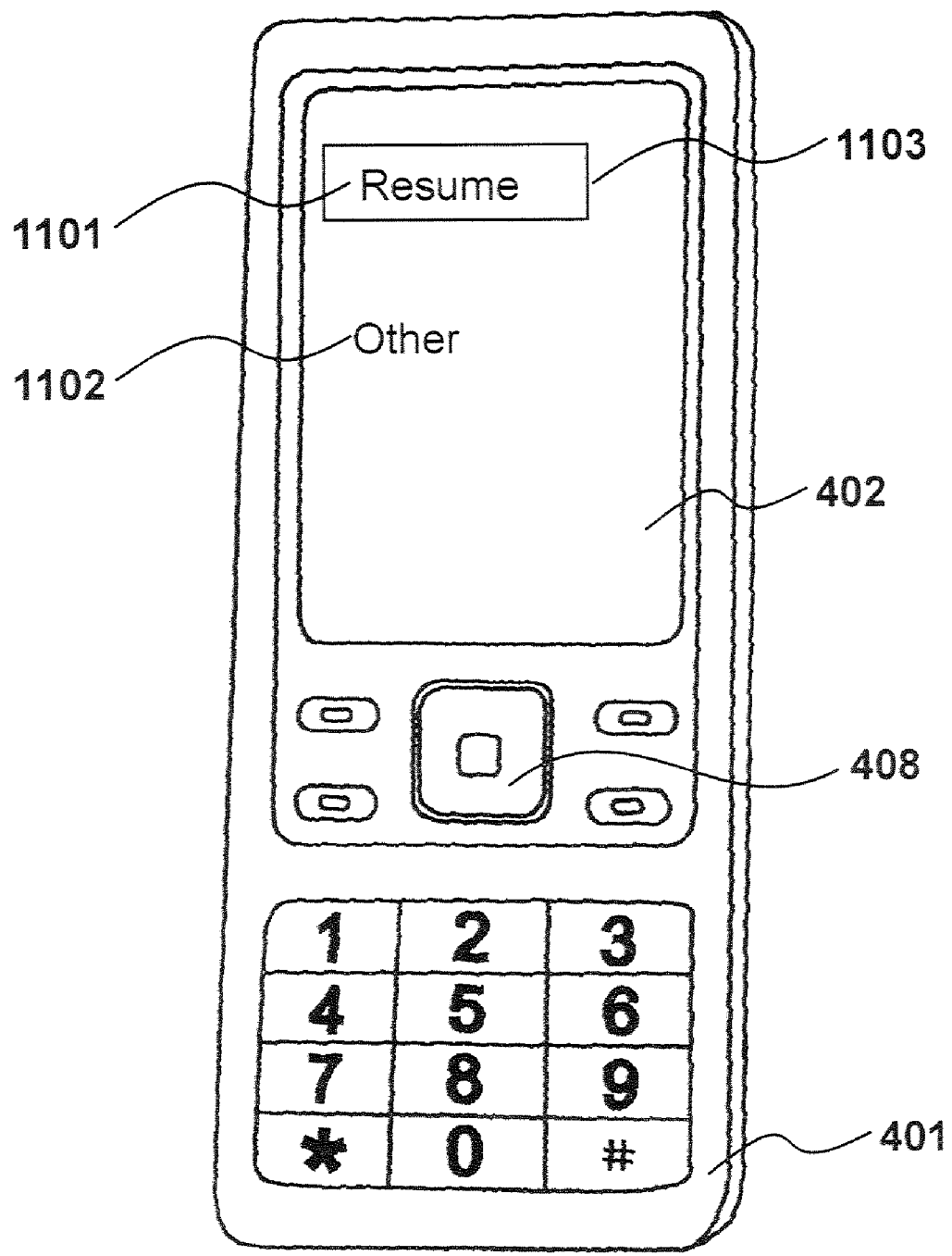
FIG. 11 shows a mobile telephone displaying options.
Figure 13:
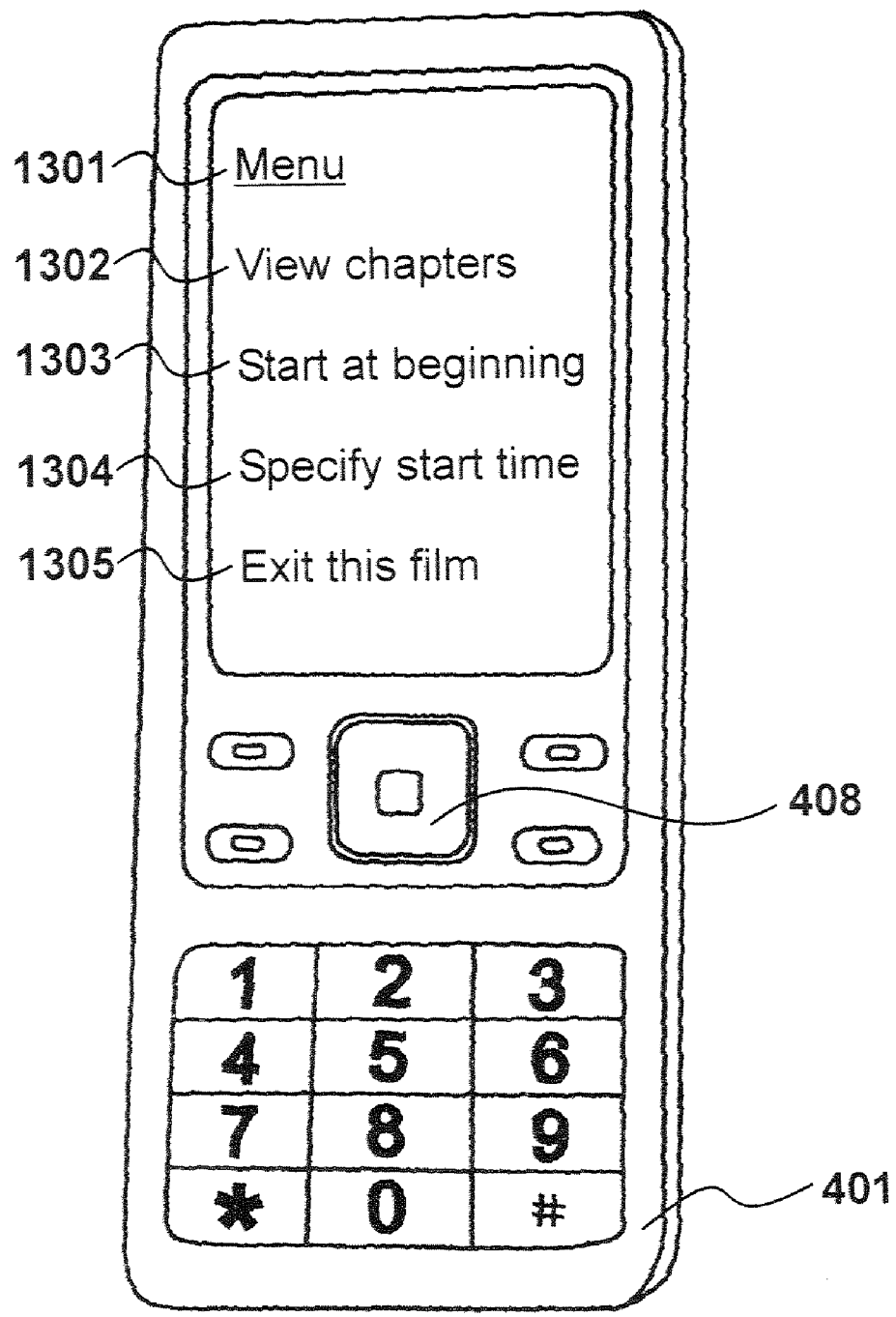
FIG. 13 illustrates the display of a further menu.

As a result of the WAP server 106 receiving initiation communication 309, a menu is supplied as shown by communication 310. This menu is displayed on mobile telephone 401 as shown in FIG. 11. In FIG. 11, mobile telephone 401 is shown displaying options on screen 402. A first option 1101 is provided which allows a user to resume playing the last asset as shown in FIG. 12. A second option 1102 is also provided, selection of which results in the display of a further menu as shown in FIG. 13.

In this example, a user has selected, using scroll button 408, to resume play. This is shown by box 1103. This selection results in a location request being sent from mobile telephone 401 to WAP server 106, as represented by communication 311. Upon receipt of this request, WAP server 106 consults database 901 for information relating to the asset and user concerned. In this example, line 908 of database 901 has the information that this asset (film B) was halted at a time of 01:04:33. This information, along with other link information as provided at 304, is sent to mobile telephone 401 as shown by communication 312.

In a refinement of the embodiment it may be the case that a small rewind of for example 3 seconds occurs so that a small portion of the asset is streamed again. This would allow for the possibility that the mobile telephone 401 may have stopped receiving the stream but the asset server 107 may not have been aware immediately, until it failed to receive an acknowledgement. The degree of rewind would vary according to the length of timeout of the asset server when acknowledgements are not received. A rewind may be effected by the asset server 107, in that it may subtract for example 3 seconds from the time before providing it to WAP server 106 to record in database 901. Alternatively, WAP server 106 may subtract time from the halt time stored before supplying it to mobile telephone 401 at 312. The rewind may alternatively be effected elsewhere in the procedure.

Once the link and halt data have been received by mobile telephone 401, a data request is sent, along with the halt data, to asset server 107, as shown by communication 313. Although in this example the same asset server (107) that provided the asset when the first portion was streamed is used, any asset server providing the required asset can be used. Asset server 107 then, on receipt of the halt data, streams the asset from the halt position, i.e. in this example it begins the stream at a time of 01:04:33, if no rewind is configured, or, for example at 01:04:30 if a rewind of three seconds is configured. The stream is provided to mobile telephone 401, as shown by communication 314. An illustration of the resumed stream being displayed to a user on screen 402 of mobile telephone 401 is shown in FIG. 12. In the present example, the stream may be halted and resumed any number of times, and on each occasion may be accessed via the same asset server 107 or a different asset server such as server 108 or any other asset server.

An illustration is given in FIG. 13 of the display of a further menu, provided following the selection of option 1102 ("other"). This menu is supplied by WAP server 106. Mobile telephone 401 is shown in FIG. 13 to display four options. The heading "Menu" at 1301 is followed by options "View chapters" 1302, "Start at beginning" 1303, "Specify start time" 1304 and "Exit this film" 1305. A user provides input using scroll button 408 in order to select one of the displayed options.

Figure 14:
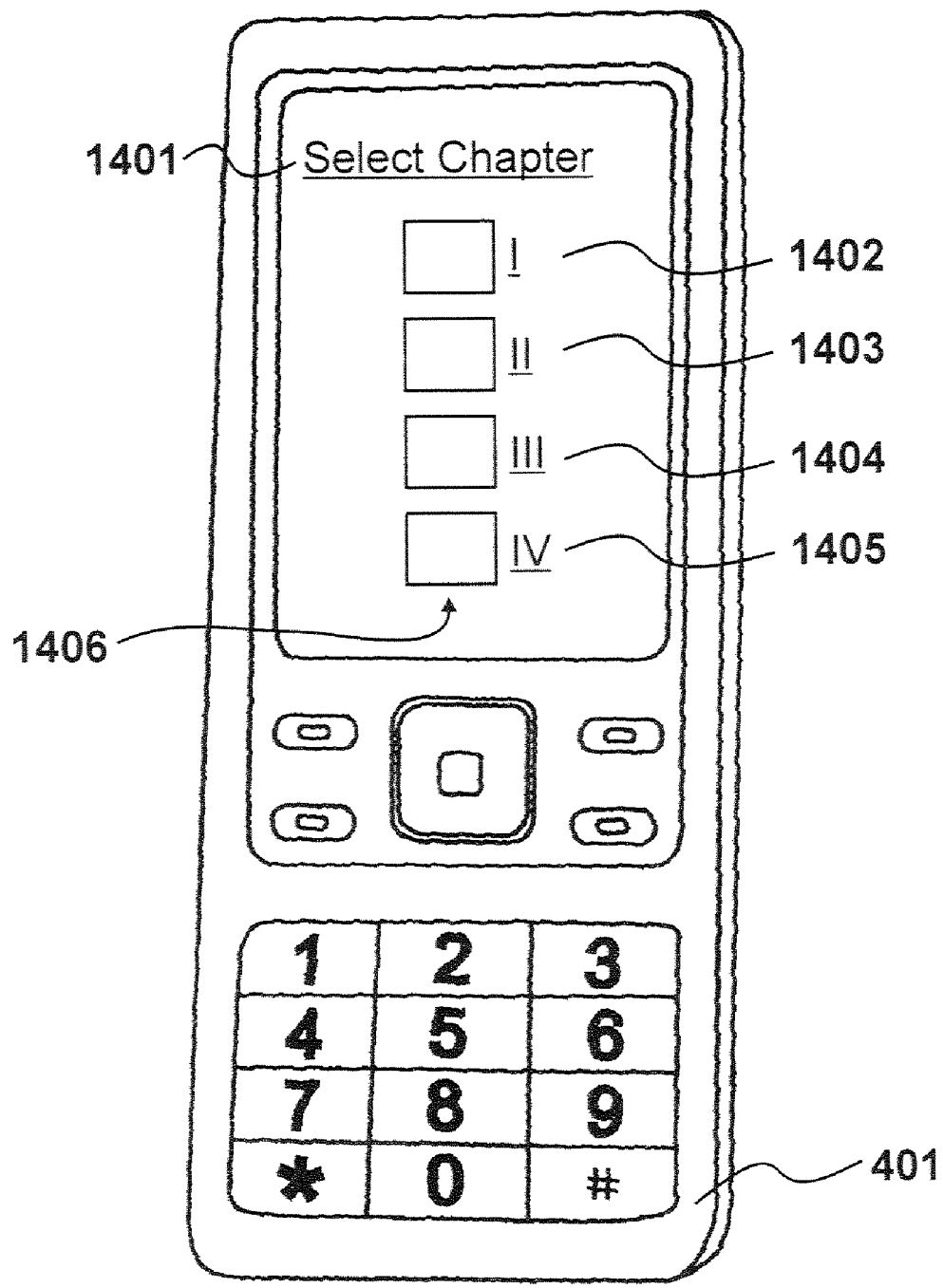
FIG. 14 illustrates a display allowing chapters to be viewed.

An illustration of a further screen displayed on mobile telephone 401 as a result of user input being received selecting option 1302 ("View chapters") is shown in FIG. 14. At 1401 a user is invited to "Select chapter" from options given below at 1402 "I", 1403 "II", 1404 "III" and 1405 "IV". In this example, thumbnails showing appropriate images are displayed at 1406. Thumbnails 1406 are from the asset and each thumbnail has an associated time code representing its temporal position within the asset. User input can be received indicating a preference to view the asset from the position of one of said chapters and as a result a data request with a chapter selection is sent from mobile telephone 401 to WAP server 106. WAP server 106 then looks up the time code for the start of the selected chapter, and supplies this information to mobile telephone 401 along with the relevant link data for that asset. Mobile telephone 401 then sends a data request along with the time code to asset server 107, which then streams the asset from the time code. In this way, the time code associated with the selected chapter is processed in the same way as halt data, such that streaming commences from the time code.

If a user selects option 1303 "Start at beginning", then either a halt position of zero or no halt position is supplied. Depending upon the nature of the subscription to the asset, it may or may not be possible for a user to start to view an asset from the beginning having already partially viewed it. Therefore, if a user is only permitted to view an asset once, then an error message would be displayed on mobile telephone 401 as a result of selection of option 1303.

Figure 15:
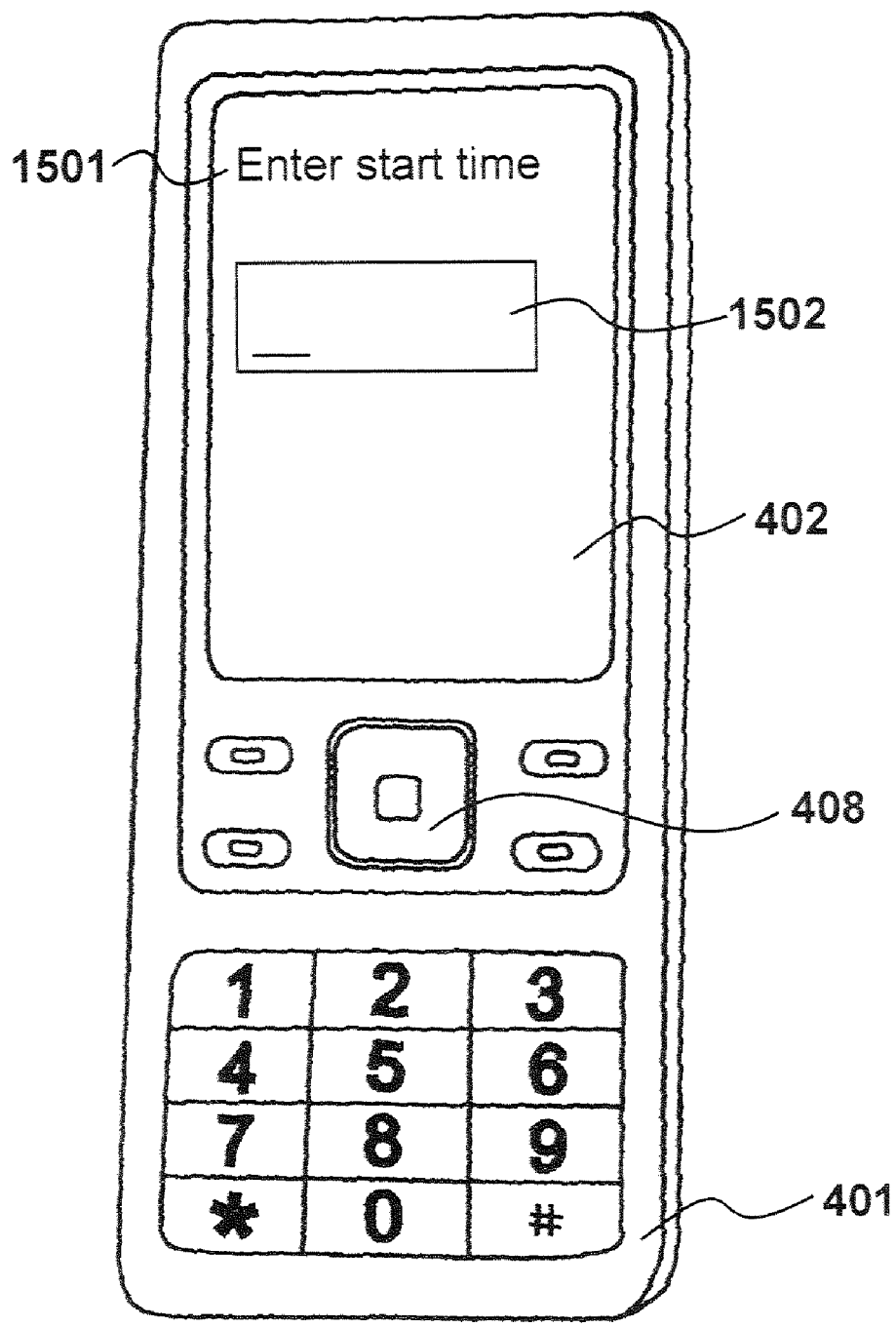
FIG. 15 illustrates a display allowing a start time to be specified.

An example of a screen displayed as a result of selection of option 1304 ("Specify start time") is shown in FIG. 15. Mobile telephone 401 is shown displaying, on screen 402, a prompt at 1501 for a user to "Enter start time". A text box 1502 is provided into which a user may enter, using scroll button 408 or any other appropriate input means, the time at which they wish to commence viewing an asset. This information is then forwarded to asset server 107, in the same manner as the halt data or the chapter time code as previously described. The asset server then starts streaming from the requested start time, subject to the user having an appropriate subscription to allow them to access the asset.

Figure 16:
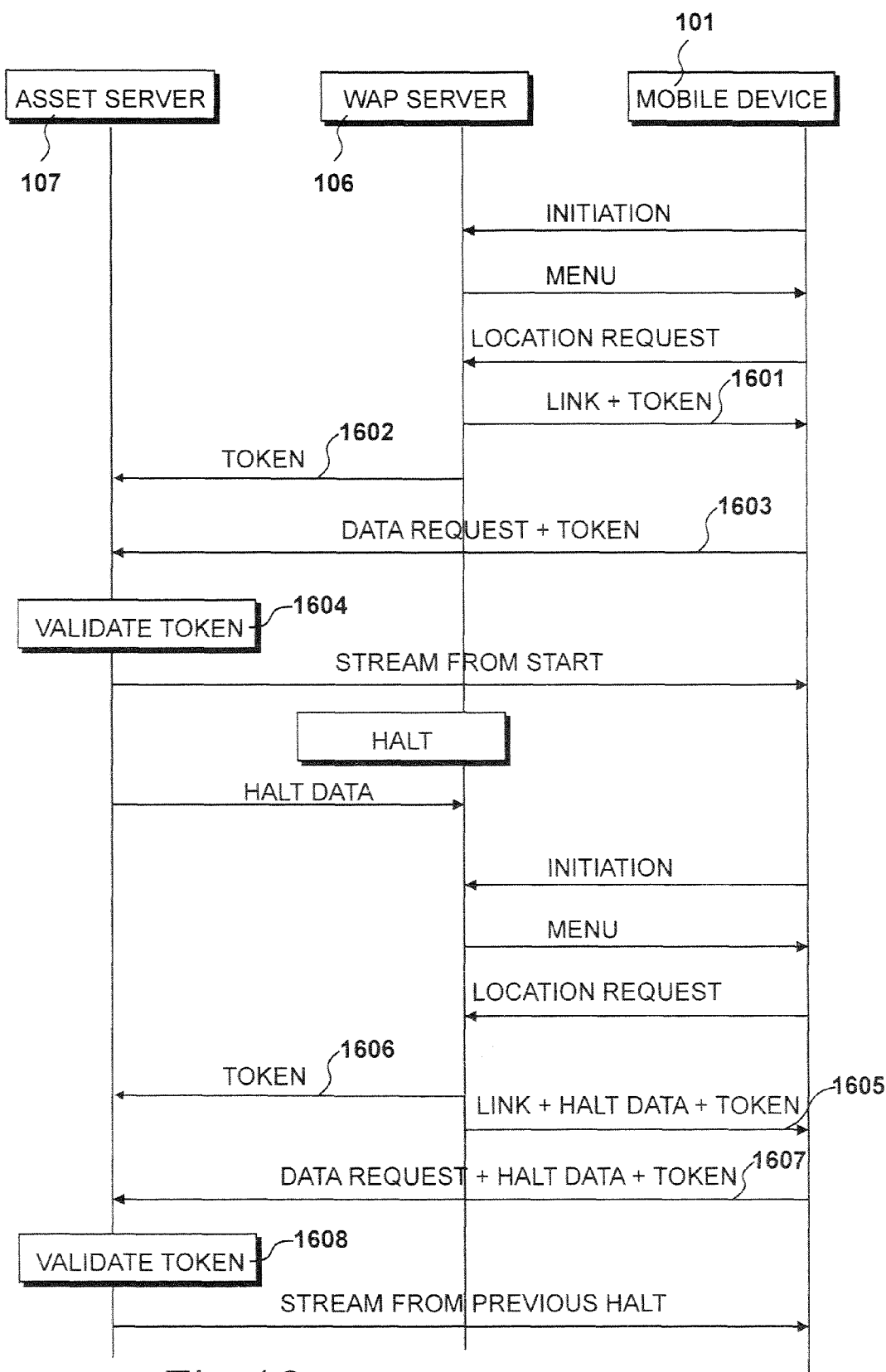
FIG. 16 illustrates a further telecommunications diagram

A similar telecommunications diagram to FIG. 3 is shown in FIG. 16, but with the addition of a stream locking facility. With stream locking, when a user has made appropriate payment for a stream to be supplied, for example has purchased a particular asset, the WAP server generates a token. Typically, a token may be thirty to forty characters long, and is unique to a particular play of an asset. The mobile device such as mobile telephone 401 is given the token by WAP server 106, as shown at 1601. As shown at 1602, WAP server 106 also supplies the token directly to asset server 107.

The data request subsequently sent from mobile device 101 to asset server 107 includes the token, as shown at 1603. The asset server validates the received token by checking it matches with a valid token it has received from WAP server 106. This validation occurs at 1604. If the tokens match, then asset server 107 begins streaming the asset to mobile device 101. After the stream collapses the token expires.

In this example asset server 107 holds received tokens in a database. When the token received from mobile device 101 is found by asset server 107 to match a token in its database, it deletes the token from its database before the stream is started. Thus, the use of tokens prevents a stream from being forwarded to another user.

If a halt occurs when an asset has only been partially streamed, then a new token may be issued, as shown at 1605. Again, the new token is provided to asset server 107, as shown at 1606. Similarly, asset server 107 stores the new token in a database. Mobile device 101 then sends the new token along with a data request and the halt data, when a user wishes to resume play, as shown at 1607. The database at asset server 107 then validates the new token at 1608 and deletes it from its database before it resumes streaming.

What I claim is:

1. Apparatus for streaming video data to mobile devices, said apparatus comprising a support server and an asset server, wherein:

said support server receives to initiate a transaction a first request from a mobile device for a selected video asset;

said support server relays the first request to said asset server and issues a token referencing the transaction to the mobile device and to said asset server;

said asset server receives a data request from the mobile device comprising said token;

said asset server serves the selected video asset as a video stream to the mobile device from the start of the selected video asset; and, when the video stream is halted at a halt position:

said asset server provides an indication of said halt position to said support server;

said support server records an indication of the mobile device and said halt position;

said support server receives to initiate a resumed transaction a second request from the mobile device for the selected video asset;

said support server relays the second request to said asset server and issues a new token referencing the resumed transaction; and said asset server serves the selected video asset as a video stream to the requesting mobile device from said halt position.

2. The apparatus as claimed in claim 1, wherein the mobile device is a mobile cellular telephone.

3. The apparatus as claimed in claim 2, wherein the mobile cellular telephone is configured to display a resume menu, as a result of the relaying of the second request to said asset server.

4. The apparatus as claimed in claim 1, wherein said support server includes a database and the recording of said indication of the mobile device and said halt position is recorded in said database.

5. A method of streaming video data to mobile devices, comprising the steps of:

receiving a first request at a support server from a mobile device for a selected video asset;

relaying the first request to an asset server, including issuing a token to the mobile device and to the asset server;

receiving a data request at the asset server from the mobile device comprising said token;

serving the selected video asset as a video stream to the mobile device, from the start of the selected video asset;

halting the video stream at a halt position and providing an indication of said halt position to the support server;

recording at the support server an indication of the mobile device and said halt position;

receiving a second request from the mobile device for the selected video asset;

relaying the second request and said halt position to the asset server; and serving the selected video asset as a video stream to the mobile device from said halt position.

6. The method as claimed in claim 5, wherein the second request and any subsequent request to the asset server include data identifying a start location.

7. The method as claimed in claim 6, wherein said data identifying a start location is conveyed in accordance with a common gateway interface.

8. The method as claimed in claim 5, wherein the asset server compares tokens before serving the selected video asset as a video stream.

9. A non-transitory computer-readable medium encoded with program instructions executable by a computer or by a network of computers configured to implement a support server within a mobile telecommunications environment such that when executing said instructions said support server will perform the steps of:

receiving a first request from a mobile device for a selected video asset;

relaying said first request to an asset server, including issuing a token to the mobile device and to the asset server;

identifying a condition to the effect that the asset server has received a data request from the mobile device comprising said token, and that the asset server has begun serving the selected video asset as a video stream to the mobile device, from the start of the selected video asset;

recording an indication of the mobile device and a halt position of the video stream when a halt condition is created;

receiving a second request from the mobile device for the selected video asset;

relaying the second request and said halt position to an asset server, so that the asset server serves the selected video asset as a video stream to the mobile device from said halt position.

10. The non-transitory computer-readable medium encoded with program instructions executable by a computer as claimed in claim 9, such that when executing said instructions a feature length movie is selected as the selected video asset.

11. The non-transitory computer-readable medium encoded with program instructions executable by a computer as claimed in claim 9, such that when executing said instructions said support server communicates with the asset server in accordance with the real time streaming protocol.

12. The non-transitory computer-readable medium encoded with program instructions executable by a computer as claimed in claim 9, such that when executing said instructions the asset server performs a halting process to create said halt condition as a result of an activation made by a user or as a result of a network failure.

13. The non-transitory computer-readable medium encoded with program instructions executable by a computer as claimed in claim 9, such that when executing said instructions at said support server the recording of the indication is written to a database held at said support server.

\* \* \* \* \*